United States Patent
Li

(10) Patent No.: US 12,101,842 B2
(45) Date of Patent: Sep. 24, 2024

(54) DISCONTINUOUS RECEPTION CONFIGURATION METHOD AND DEVICE

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 576 days.

(21) Appl. No.: 17/284,765

(22) PCT Filed: Oct. 19, 2018

(86) PCT No.: PCT/CN2018/111072
§ 371 (c)(1),
(2) Date: Apr. 12, 2021

(87) PCT Pub. No.: WO2020/077629
PCT Pub. Date: Apr. 23, 2020

(65) Prior Publication Data
US 2021/0345443 A1    Nov. 4, 2021

(51) Int. Cl.
*H04W 72/04*    (2023.01)
*H04W 76/28*    (2018.01)

(52) U.S. Cl.
CPC .................. *H04W 76/28* (2018.02)

(58) Field of Classification Search
CPC . H04W 76/28; H04W 24/02; H04W 52/0248; Y02D 30/70
See application file for complete search history.

(56) References Cited

U.S. PATENT DOCUMENTS

| 9,654,994 | B2 | 5/2017 | Pelletier et al. |
| 2010/0238880 | A1 | 9/2010 | Wu |
| 2018/0049047 | A1 | 2/2018 | Lin et al. |
| 2019/0053159 | A1* | 2/2019 | Wei ................ H04W 52/0216 |

(Continued)

FOREIGN PATENT DOCUMENTS

| CN | 101841897 A | 9/2010 |
| CN | 102014441 A | 4/2011 |

(Continued)

OTHER PUBLICATIONS

International Search Report issued in PCT Application No. PCT/CN2018/111072, Mar. 27, 2019, (4p).

(Continued)

*Primary Examiner* — Mahbubul Bar Chowdhury
(74) *Attorney, Agent, or Firm* — Arch & Lake LLP; Hao Tan; Zhangyuan Ji

(57) ABSTRACT

The present disclosure provides a method and apparatus for discontinuous reception (DRX) configuration. The method is applicable to a base station. The base station configures a corresponding designated DRX parameter for a designated BWP. The base station configures at least one bandwidth part (BWP) for a terminal. The base station generates a DRX configuration information for indicating that the designated DRX parameter is to be used on the designated BWP. The base station sends the DRX configuration information to the terminal for the terminal to use the designated DRX parameter on the designated BWP based on the DRX configuration information.

12 Claims, 9 Drawing Sheets

(56) References Cited

U.S. PATENT DOCUMENTS

| | | | | |
|---|---|---|---|---|
| 2020/0029315 A1* | 1/2020 | Lin | .................... | H04L 1/0075 |
| 2020/0037247 A1* | 1/2020 | Liao | .................. | H04W 72/0453 |
| 2020/0037396 A1* | 1/2020 | Islam | ................ | H04W 52/0229 |
| 2020/0053825 A1* | 2/2020 | Hwang | ................ | H04W 76/28 |
| 2020/0187293 A1* | 6/2020 | Kuang | ................ | H04W 76/28 |
| 2020/0229089 A1* | 7/2020 | Tang | .................... | H04L 5/001 |
| 2020/0245395 A1* | 7/2020 | Zhang | ................... | H04L 5/0053 |
| 2021/0315046 A1* | 10/2021 | Xue | ....................... | H04L 69/24 |
| 2021/0360674 A1* | 11/2021 | Lim | .................... | H04L 5/0098 |

FOREIGN PATENT DOCUMENTS

| | | |
|---|---|---|
| CN | 102036347 A | 4/2011 |
| CN | 104704881 A | 6/2015 |
| CN | 108377537 A | 8/2018 |
| CN | 108377551 A | 8/2018 |
| CN | 108377581 A | 8/2018 |
| WO | 2016057156 A1 | 4/2016 |

OTHER PUBLICATIONS

Nokia, Nokia Shanghai Bell "Clarifications to BWP operation", 3GPP TSG-RAN WG2 Meeting #101, R2-1803228, Athens, Greece, Feb. 26-Mar. 2, 2018, (4p).

State Intellectual Property Office of the People's Republic of China, Office Action and Search Report Issued in Application No. 201880002278.9, Jun. 30, 2021, with Machine Translation, (16p).

ISA State Intellectual Property Office of the People's Republic of China, Written Opinion of the International Searching Authority Issued in Application No. PCT/CN2018/111072, Mar. 27, 2019, WIPO, (8p).

State Intellectual Property Office of the People's Republic of China, Office Action and Search Report Issued in Application No. 201880002278.9, Jan. 4, 2022 with English translation, (14p).

Huawei, HiSilicon, "Impacts of BWP on DRX", 3GPP TSG-RAN WG2 NR #99bis, R2-1710208, Prague, CZ, Oct. 9-13, 2017, (2p).

* cited by examiner

DISCONTINUOUS RECEPTION CONFIGURATION METHOD AND DEVICE

CROSS REFERENCE TO RELATED APPLICATION

This application claims priority to International Application No. PCT/CN2018/111072 filed on Oct. 19, 2018, the entire contents of which are incorporated herein by reference for all purposes.

TECHNICAL FIELD

The present disclosure relates to the field of communication technology, and more particularly, relates to a discontinuous reception configuration method and device.

BACKGROUND

Discontinuous reception (DRX) means that a terminal stops monitoring a channel for a period of time to save power. In related art, DRX parameters can only be configured semi-statically depending on high-level signaling. However, the semi-statically configured DRX parameters have poor flexibility, which reduces the efficiency of channel monitoring.

SUMMARY

In order to overcome the problems existing in the related art, examples of the present disclosure provide a discontinuous reception configuration method and apparatus.

According to a first aspect of the present disclosure, a method for discontinuous reception (DRX) configuration is provided. The method applied to a base station which configures at least one bandwidth part (BWP) for a terminal. The base station configures a corresponding designated DRX parameter for a designated BWP. The base station generates DRX configuration information for indicating that the designated DRX parameter is to be used on the designated BWP. The base station sends the DRX configuration information to the terminal for the terminal to use the designated DRX parameter on the designated BWP based on the DRX configuration information.

According to a second aspect of the present disclosure, a method for DRX configuration is provided. The method applied to a terminal. The terminal receives a DRX configuration information sent by a base station. The DRX configuration information indicates that a designated DRX parameter is to be used on a designated BWP. The base station configures at least one BWP for the terminal. The terminal uses the designated DRX parameter on the designated BWP based on the DRX configuration information.

According to a third aspect of the present disclosure, a computing device is provided. The computing device may include one or more processors, a non-transitory computer-readable memory storing instructions executable by the one or more processors. The one or more processors may be configured to receive a DRX configuration information sent by the base station. The DRX configuration information indicates that a designated DRX parameter is to be used on a designated BWP. The base station configures at least one BWP for a terminal. The one or more processors may further be configured to use the designated DRX parameter on the designated BWP based on the DRX configuration information.

The technical solutions provided by the embodiments of the present disclosure may produce the following beneficial effects:

The base station in the present disclosure can configure a corresponding designated DRX parameter for a designated BWP; generate a DRX configuration information for indicating that the designated DRX parameter is to be used on the designated BWP, and send the DRX configuration information to the terminal for the terminal to use the designated DRX parameter on the designated BWP based on the DRX configuration information, thereby realizing the dynamic configuration of the designated DRX parameters used on each designated BWP, improving the flexibility of DRX parameter configuration, and reducing the power consumption for channel monitoring.

The terminal in the present disclosure can receive a DRX configuration information sent by the base station, the DRX configuration information is to indicate that a designated DRX parameter is to be used on a designated BWP; and use the designated DRX parameter on the designated BWP based on the DRX configuration information, thereby realizing the dynamic configuration of the designated DRX parameters used on each designated BWP, improving the flexibility of DRX parameter configuration, and reducing the power consumption for channel monitoring.

It should be understood that the above general description and the following detailed description are only exemplary and explanatory and are not restrictive of the present disclosure.

BRIEF DESCRIPTION OF THE DRAWINGS

The drawings herein are incorporated into the specification and constitute a part of the specification, show embodiments in accordance with the present disclosure, and together with the specification are used to explain the principle of the present disclosure.

DETAILED DESCRIPTION OF THE EMBODIMENTS

The exemplary embodiments will be described in detail here, and examples thereof are illustrated in the accompanying drawings. When the following description refers to the accompanying drawings, unless otherwise indicated, the same reference signs in different drawings designate the same or similar elements. The implementation manners described in the following exemplary embodiments do not represent all the implementation manners consistent with the present disclosure. Rather, they are merely examples of devices and methods consistent with some aspects of the present invention as detailed in the appended claims.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should further be understood that the term "and/or" used herein refers to and includes any or all possible combinations of one or more associated listed items.

It should be understood that although the terms first, second, third, etc. may be used in the present disclosure to describe various information, the information should not be limited to these terms. These terms are only used to distinguish the same type of information from each other. For example, without departing from the scope of the present disclosure, first information may be referred as second information; and similarly, second information may also be referred as first information. Depending on the context, the word "if" as used herein can be interpreted as "upon" or "when" or "in response to determination".

Figure 1:
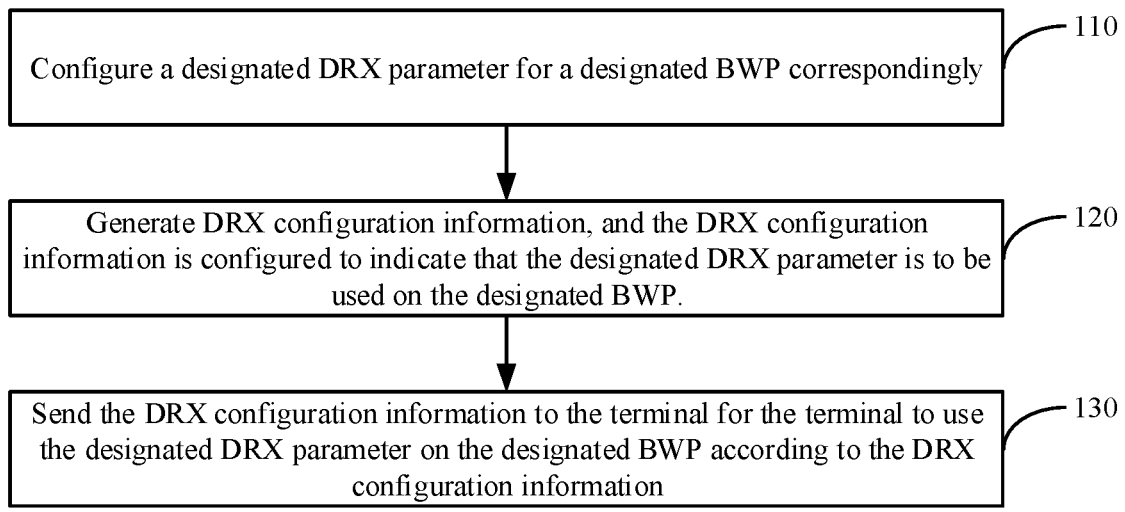
FIG. 1 is a flowchart illustrating a discontinuous reception configuration method according to an example.
Figure 2:
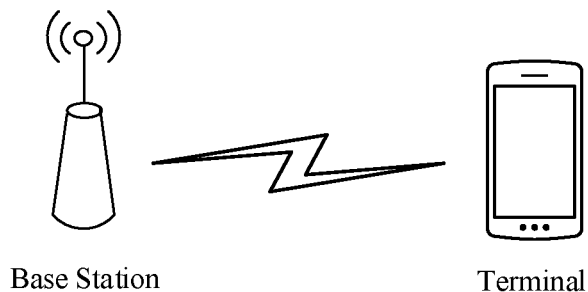
FIG. 2 is an application scenario illustrating a DRX configuration method according to an example.

FIG. 1 is a flowchart illustrating a discontinuous reception configuration method according to an example. FIG. 2 is an application scenario illustrating a DRX configuration method according to an example. The DRX configuration method may be applied in a base station. The base station configures at least one band width part (BWP) for a terminal.

As shown in FIG. 1, the DRX configuration method may include the following steps 110-130.

At step 110, a designated DRX parameter is configured for a designated BWP correspondingly.

In the embodiments of the present disclosure, in order to save the power, the base station can dynamically configure the designated DRX parameter used on each designated BWP for the terminal. The designated DRX parameter may include at least one of the following:

(1-1) a DRX wake-up duration configured for monitoring physical downlink control channel (PDCCH) and/or monitoring physical downlink shared channel (PDSCH);

(1-2) a DRX inactivity timer configured to delay the DRX wake-up duration;

(1-3) a short DRX cycle;

(1-4) a long DRX cycle; and (1-5) a DRX short cycle timer configured to enter the long DRX cycle after the DRX short cycle timer expires.

In (1-1), the DRX wake-up duration is used to configure a duration for monitoring the PDCCH and/or monitoring the PDSCH in a DRX cycle. During this duration, the terminal is in a wake-up state.

In (1-2), the DRX inactivity timer is mainly used to delay the DRX wake-up duration. For example, in a later period of the DRX wake-up duration, a network side happens to have a large number of data to be sent to the terminal, and the remaining DRX wake-up duration is not long enough for transmitting this large packet. If the terminal enters a sleep stage at this time, it can only complete the transmission of the packet when the next DRX wake-up duration comes, which increases the processing delay of the entire service. To avoid this situation, a DRX inactivity timer is introduced, which can reduce the data processing delay.

In (1-3), (1-4), and (1-5), the system can configure a short DRX cycle or a long DRX cycle for the terminal according to different service scenarios. If both the short DRX cycle and the long DRX cycle are configured, when the DRX short cycle timer expires, the terminal may enter the long DRX cycle. For example, if a value of the short DRX cycle timer indicates two short DRX cycles, it means that the long DRX cycle is entered without successfully decoding the PDCCH within two short DRX cycles.

In an embodiment, the designated BWP in step 110 may be any BWP configured by the base station for the terminal.

In an embodiment, the designated BWP in step 110 may be a target BWP to which the base station instructs the terminal to switch a BWP.

In an embodiment, the designated BWP in step 110 may be a default BWP and/or an initial BWP for implementing automatic BWP fall back function. The function of BWP to automatically fall back to the default BWP or the initial BWP is: if a currently activated BWP has been inactive for a period of time, the currently activated BWP may automatically fall back to the default BWP, and if the default BWP is not configured, the currently activated BWP may automatically fall back to the initial BWP. The initial BWP is a BWP configured by the base station for the terminal through a system message. The default BWP is a small BWP specifically set by the base station for the terminal so as to save power. In this way, monitoring the PDCCH and/or monitoring the PDSCH on the small BWP can save power.

At step 120, DRX configuration information is generated, and the DRX configuration information is configured to indicate that the designated DRX parameter is to be used on the designated BWP.

At step 130, the DRX configuration information is sent to the terminal for the terminal to use the designated DRX parameter on the designated BWP according to the DRX configuration information.

In an exemplary scenario, as shown in FIG. 2, a base station and a terminal are included. The base station can configure the corresponding designated DRX parameter for the designated BWP, generate DRX configuration information for indicating that the designated DRX parameter is to be used on the designated BWP, and send the DRX configuration information to the terminal. After the terminal receives the DRX configuration information sent by the base station, the designated DRX parameter can be used on the designated BWP according to the DRX configuration information.

It can be seen from the above embodiment that DRX configuration information is generated by configuring the corresponding designated DRX parameter for the designated BWP, where the DRX configuration information is used to indicate that the designated DRX parameter is to be used on the designated BWP, and the DRX configuration information is sent to the terminal so that the terminal uses the designated DRX parameter on the designated BWP according to the DRX configuration information, thereby realizing the dynamic configuration of the designated DRX parameter used on each designated BWP, improving the flexibility of DRX parameter configuration, and reducing the power consumption for channel monitoring.

Figure 3:
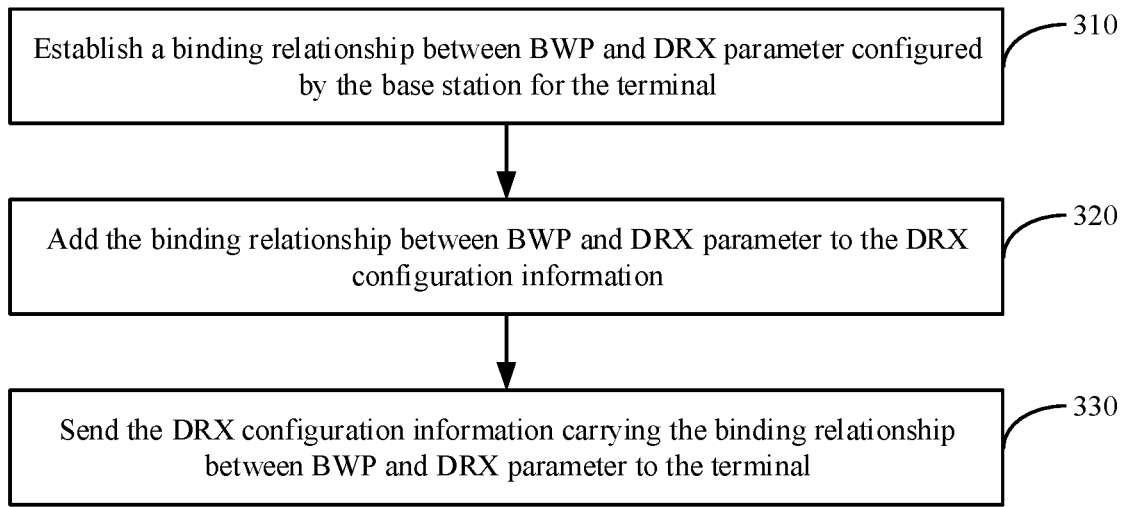
FIG. 3 is another flowchart illustrating a discontinuous reception configuration method according to an example.

FIG. 3 is a flowchart illustrating another discontinuous reception configuration method according to an example. The DRX configuration method may be applied in a base station and is established on the basis of the method in FIG. 1. The designated BWP is any one of the BWPs configured by the base station for the terminal. As shown in FIG. 3, when performing step 130, the method may include the following steps 310-330.

At step 310, a binding relationship between BWP and DRX parameter configured by the base station for the terminal is established.

In the embodiments of the present disclosure, when configuring the corresponding DRX parameter for the BWP, the base station can establish a binding relationship between BWP and DRX parameter, and inform the terminal of the binding relationship through the DRX configuration information, so that the terminal can learn the binding relationship between BWP and DRX parameter quickly from the received DRX configuration information.

In an embodiment, the binding relationship in step 310 may comprise a one-to-one correspondence between BWP and DRX parameter, and/or a many-to-one correspondence between BWP and DRX parameter.

For example: BWP 1 is bound to DRX parameter 1, BWP 2 is bound to DRX parameter 2, and BWP 3 is bound to DRX parameter 3.

For another example, BWPs bound to DRX parameter 1 include: BWP 1, BWP 2, and BWP 3.

For another example: BWP 1 bound to DRX parameter 1; BWPs bound to DRX parameter 2 include: BWP 2 and BWP 3.

At step 320, the binding relationship between BWP and DRX parameter is added to the DRX configuration information.

At step 330, the DRX configuration information carrying the binding relationship between BWP and DRX parameter is sent to the terminal.

It can be seen from the above embodiment that the binding relationship between BWP and DRX parameter configured by the base station for the terminal can be established, the binding relationship between BWP and DRX parameter can be added to the DRX configuration information, and the DRX configuration information carrying the binding relationship between BWP and DRX parameter is sent to the terminal, so that when the terminal switches from a currently activated BWP to a target BWP, a target DRX parameter corresponding to the target BWP can be determined according to the binding relationship and the target DRX parameter is used on the target BWP, thereby improving the accuracy of DRX parameter configuration.

Figure 4:
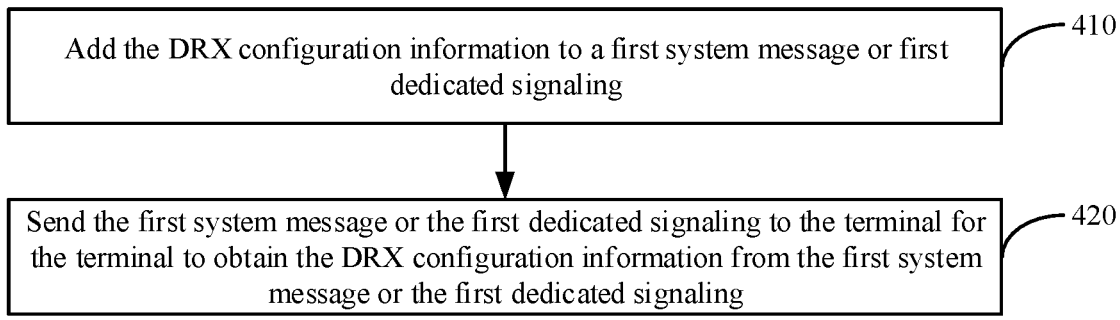
FIG. 4 is another flowchart illustrating a discontinuous reception configuration method according to an example.

FIG. 4 is a flowchart illustrating another discontinuous reception configuration method according to an example. The DRX configuration method may be applied in a base station and is established on the basis of the method in FIG. 3. As shown in FIG. 4, when performing step 330, the method may include the following steps 410-420.

At step 410, the DRX configuration information is added to a first system message or first dedicated signaling;

At step 420, the first system message or the first dedicated signaling is sent to the terminal for the terminal to obtain the DRX configuration information from the first system message or the first dedicated signaling.

It can be seen from the foregoing embodiments that the DRX configuration information can be informed to the terminal through the first system message or the first dedicated signaling, thereby improving the reliability of DRX configuration information transmission.

Figure 5:
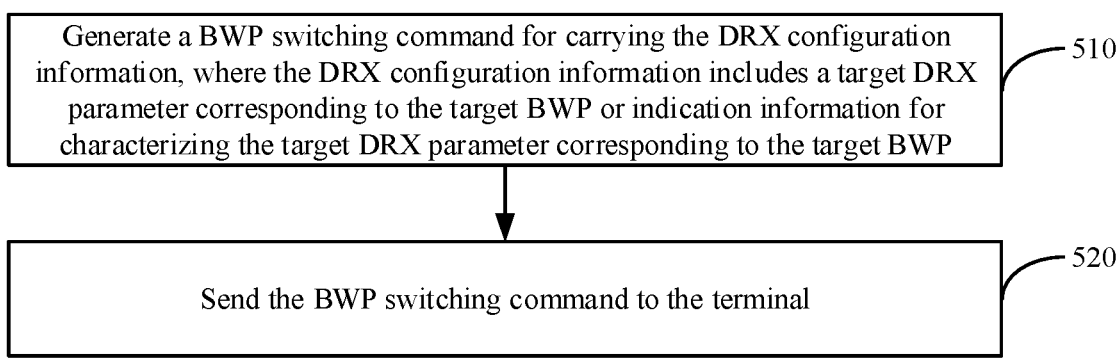
FIG. 5 is another flowchart illustrating a discontinuous reception configuration method according to an example.

FIG. 5 is a flowchart illustrating another discontinuous reception configuration method according to an example. The DRX configuration method may be applied in a base station and is established on the basis of the method in FIG. 1. The designated BWP is a target BWP to which the base station instructs the terminal to switch a BWP. As shown in FIG. 5, when performing step 130, the method may include the following steps 510-520.

At step 510, a BWP switching command for carrying the DRX configuration information is generated. The DRX configuration information includes a target DRX parameter corresponding to the target BWP or indication information for characterizing the target DRX parameter corresponding to the target BWP.

In the embodiment of the present disclosure, the BWP switching command is a command issued when the base station needs to inform the terminal to perform BWP switching. If the BWP switching command includes the target DRX parameter corresponding to the target BWP, when the terminal switches to the target BWP, a DRX parameter used on the target BWP is adjusted to the target DRX parameter included in the BWP switching command.

At step 520, the BWP switching command is sent to the terminal.

It can be seen from the above embodiment that a BWP switching command for carrying DRX configuration information can be generated. The DRX configuration information includes the target DRX parameter corresponding to the target BWP or the indication information for characterizing the target DRX parameter corresponding to the target BWP, and the BWP switching command is sent to the terminal, so that when the terminal switches from the currently activated BWP to the target BWP, the corresponding DRX parameters can be used on the target BWP, thereby realizing the DRX parameter adjustment for BWP switching and improving the practicality DRX parameter configuration.

Figure 6:
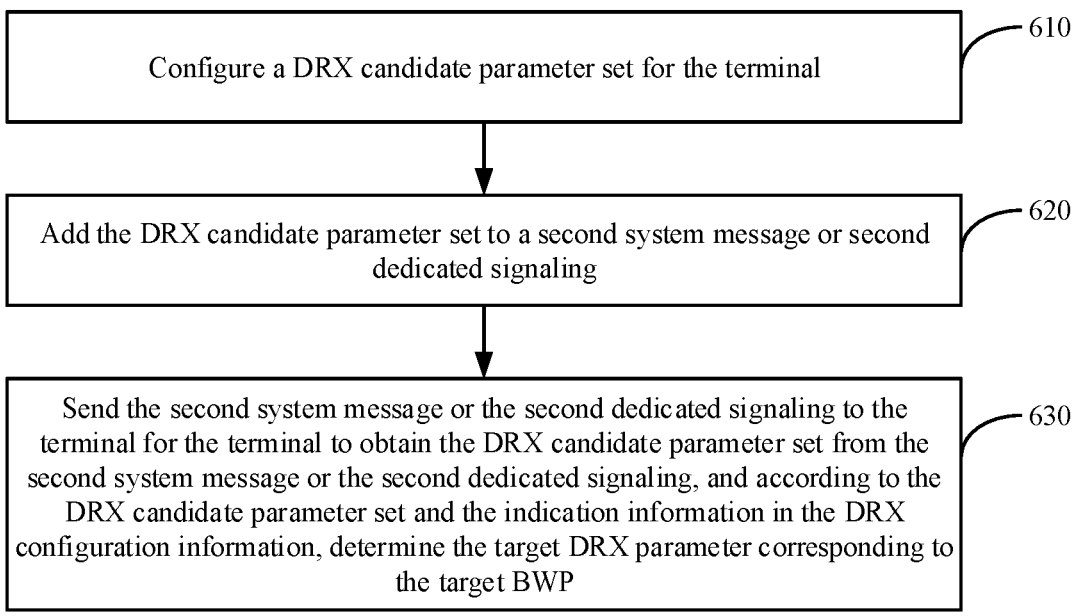
FIG. 6 is another flowchart illustrating a discontinuous reception configuration method according to an example.

FIG. 6 is a flowchart illustrating another discontinuous reception configuration method according to an example. The DRX configuration method may be applied in a base station and is established on the basis of the method in FIG. 5. As shown in FIG. 6, the DRX configuration method may include the following steps 610-630.

In step 610, a DRX candidate parameter set is configured for the terminal.

In the embodiments of the present disclosure, the base station configures the DRX candidate parameter set in advance according to an actual situation and informs the terminal of the DRX candidate parameter set, so that it is convenient for the terminal to obtain the DRX parameter from the DRX candidate parameter set. For example, the DRX configuration information includes indication information for characterizing a target DRX parameter corresponding to a target BWP (for example, the indication information indicates "the second one"), so that the terminal can obtain the corresponding target DRX parameter from the DRX candidate parameter set according to the indication information (for example, obtaining the second DRX candidate parameter in the DRX candidate parameter set as the target DRX parameter).

At step 620, the DRX candidate parameter set is added to a second system message or second dedicated signaling.

At step 630, the second system message or the second dedicated signaling is sent to the terminal for the terminal to obtain the DRX candidate parameter set from the second system message or the second dedicated signaling, and according to the DRX candidate parameter set and the indication information in the DRX configuration information, the target DRX parameter corresponding to the target BWP is determined.

It can be seen from the above embodiment that the DRX candidate parameter set can be configured for the terminal, and the DRX candidate parameter set can be informed to the terminal through the second system message or the second dedicated signaling, which is convenient for the terminal to accurately obtain the DRX parameter from the DRX candidate parameter set when determining the DRX parameter corresponding to the indication information in the DRX configuration information, thereby improving the reliability of determining DRX parameters.

Figure 7:
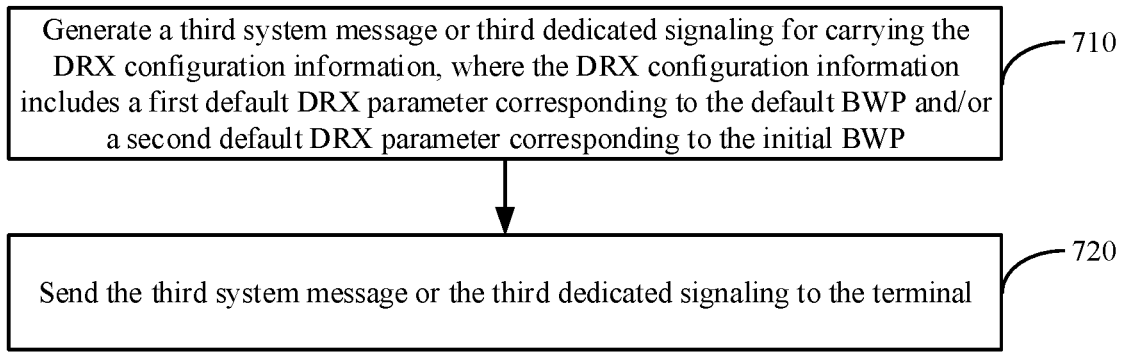
FIG. 7 is another flowchart illustrating a discontinuous reception configuration method according to an example.

FIG. 7 is a flowchart illustrating another discontinuous reception configuration method according to an example. The DRX configuration method may be applied in a base station and is established on the basis of the method in FIG. 1. The designated BWP is a default BWP and/or an initial BWP for implementing the automatic BWP fall back function. As shown in FIG. 7, when performing step 130 the DRX configuration method may include the following steps 710-720.

At step 710, a third system message or third dedicated signaling for carrying the DRX configuration information is generated. The DRX configuration information includes a first default DRX parameter corresponding to the default BWP and/or a second default DRX parameter corresponding to the initial BWP.

At step 720, the third system message or the third dedicated signaling is sent to the terminal.

It can be seen from the above embodiment that the third system message or third dedicated signaling for carrying the DRX configuration information can be generated. The DRX configuration information includes the first default DRX parameter corresponding to the default BWP, and/or the second default DRX parameter corresponding to the initial BWP and the third system message or third dedicated signaling is sent to the terminal, so that when the terminal switches from a currently activated BWP to the default BWP or the initial BWP, the corresponding DRX parameter can be used on the default BWP or the initial BWP, thereby realizing DRX parameter adjustment for realizing the automatic BWP fall back function, also expanding the application range of the DRX parameter configuration, and improving the practicability of DRX parameter configuration.

Figure 8:
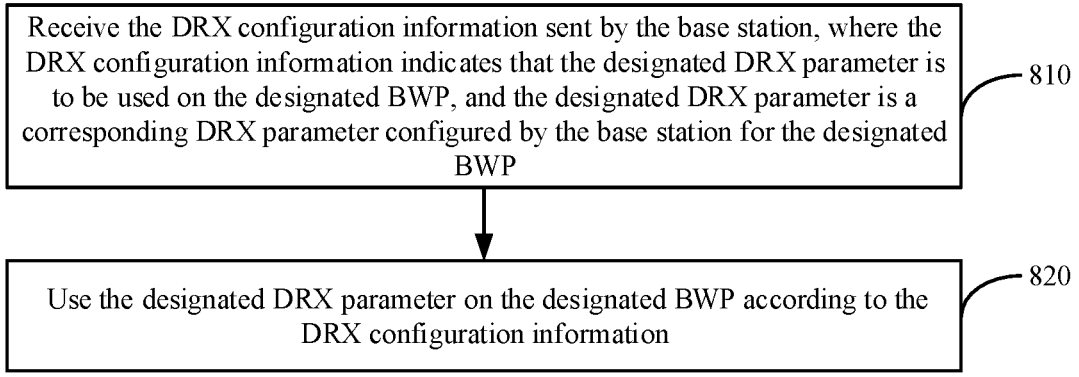
FIG. 8 is a flowchart illustrating a discontinuous reception configuration method according to an example.

FIG. 8 is a flowchart illustrating another discontinuous reception configuration method according to an example. The DRX configuration method may be applied in a base station and the terminal is configured with at least one BWP by the base station. As shown in FIG. 8, the DRX configuration method may include the following steps 810-820.

At step 810, the DRX configuration information sent by the base station is received, where the DRX configuration information indicates that the designated DRX parameter is to be used on the designated BWP, and the designated DRX parameter is a corresponding DRX parameter configured by the base station for the designated BWP.

At step 820, the designated DRX parameter is used on the designated BWP according to the DRX configuration information.

In the embodiments of the present disclosure, in order to achieve the purpose of power saving, the terminal can dynamically adjust the designated DRX parameter used on each designated BWP according to the configuration of the base station.

In an embodiment, the designated BWP is any BWP configured by the base station for the terminal, and the DRX configuration information includes the binding relationship between BWP and DRX parameter configured by the base station for the terminal; upon performing step 820, the following implementation manners can be adopted:

(2-1) when switching from the currently activated BWP to the target BWP, determine the target DRX parameter corresponding to the target BWP according to the binding relationship, and use the target DRX parameter on the target BWP.

Figure 12:
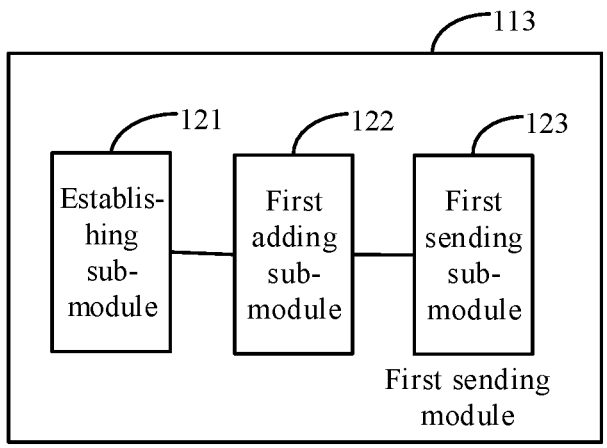
FIG. 12 is another block diagram illustrating a discontinuous reception configuration apparatus according to an example.

In an embodiment, based on the establishment of the device shown in FIG. 12, the binding relationship includes a one-to-one correspondence between BWP and DRX parameter, and/or a many-to-one correspondence between BWP and DRX parameter.

It can be seen from the above embodiments that by receiving the DRX configuration information sent by the base station, the DRX configuration information is used to indicate the use of the designated DRX parameter on the designated BWP. The designated DRX parameter is the corresponding DRX parameter configured by the base station for the designated BWP, and the designated DRX parameter is used on the designated BWP according to the DRX configuration information, thereby realizing the dynamic configuration of the designated DRX parameter used on each designated BWP, improving the flexibility of DRX parameter configuration, and reducing power consumption for channel monitoring.

Figure 9:
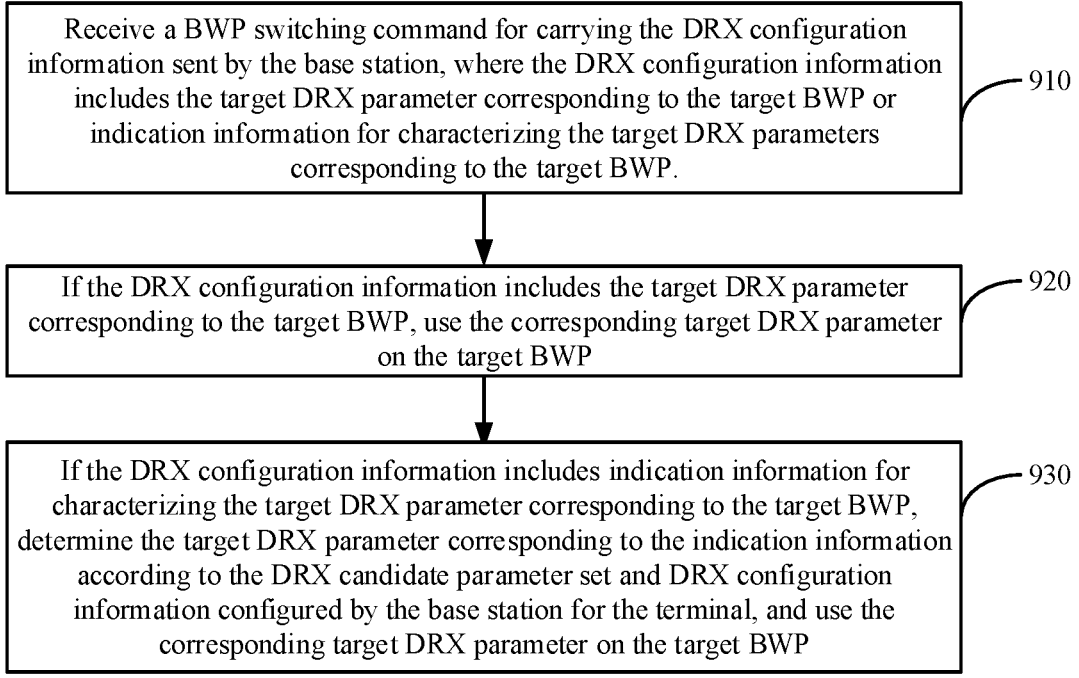
FIG. 9 is another flowchart illustrating a discontinuous reception configuration method according to an example.

FIG. 9 is a flowchart illustrating another discontinuous reception configuration method according to an example. The DRX configuration method may be applied in a base station and is established on the basis of the method in FIG. 8. The designated BWP is a target BWP to which the base station instructs the terminal to switch a BWP. As shown in FIG. 9, upon performing step 810, the method may include the following step 910.

At step 910, a BWP switching command for carrying the DRX configuration information sent by the base station is received. The DRX configuration information includes the target DRX parameter corresponding to the target BWP or indication information for characterizing the target DRX parameters corresponding to the target BWP.

Correspondingly, as shown in FIG. 9, when performing step 820, the following steps 920-930 may be included.

At step 920, if the DRX configuration information includes the target DRX parameter corresponding to the target BWP, use the corresponding target DRX parameter on the target BWP;

At step 930, if the DRX configuration information includes indication information for characterizing the target DRX parameter corresponding to the target BWP, the target DRX parameter corresponding to the indication information is determined according to the DRX candidate parameter set and DRX configuration information configured by the base station for the terminal, and the corresponding target DRX parameter is used on the target BWP.

It can be seen from the above embodiment that a BWP switching command for carrying the DRX configuration information sent by the base station is received, where the DRX configuration information includes the target DRX parameter corresponding to the target BWP or indication information for to characterizing the target DRX parameters corresponding to the target BWP; if the DRX configuration information includes the target DRX parameter corresponding to the target BWP, use the corresponding target DRX parameter on the target BWP; if the DRX configuration information includes indication information for characterizing the target DRX parameter corresponding to the target BWP, the target DRX parameter corresponding to the indication information is determined according to the DRX candidate parameter set and DRX configuration information configured by the base station for the terminal, and the corresponding target DRX parameter is used on the target BWP, thereby realizing the adjustment of DRX parameters for BWP switching and improving the practicability of DRX parameter configuration.

Figure 10:
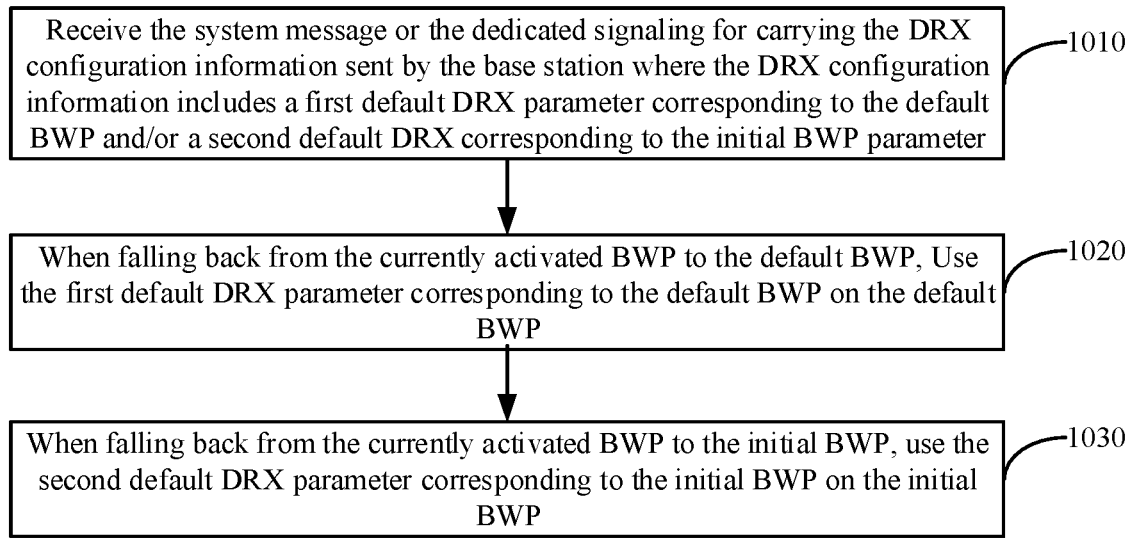
FIG. 10 is another flowchart illustrating a discontinuous reception configuration method according to an example.

FIG. 10 is a flowchart illustrating another discontinuous reception configuration method according to an example. The DRX configuration method may be applied in a base station and is established on the basis of the method in FIG. 8. The designated BWP is a default BWP and/or an initial BWP for implementing the automatic BWP fall back function. As shown in FIG. 9, when performing step 810, the method may include the following step 1010.

At step 1010, the system message or the dedicated signaling for carrying the DRX configuration information sent by the base station is received. The DRX configuration information includes a first default DRX parameter corresponding to the default BWP and/or a second default DRX corresponding to the initial BWP parameter.

Correspondingly, as shown in FIG. 10, when performing step 820, the following steps 1020-1030 may be included:

At step 1020, when falling back from the currently activated BWP to the default BWP, the first default DRX parameter corresponding to the default BWP is used on the default BWP.

At step 1030, when falling back from the currently activated BWP to the initial BWP, the second default DRX parameter corresponding to the initial BWP is used on the initial BWP.

It can be seen from the above embodiment that the system message or the dedicated signaling for carrying the DRX configuration information sent by the base station is received. The DRX configuration information includes a first default DRX parameter corresponding to the default BWP and/or a second default DRX parameter corresponding to the initial BWP; when falling back from the currently activated BWP to the default BWP, the first default DRX parameter corresponding to the default BWP is used on the default BWP; when falling back from the currently activated BWP to the initial BWP, the second default DRX parameter corresponding to the initial BWP is used on the initial BWP; thereby realizing DRX parameter adjustment for realizing the automatic BWP fall back function, expanding the application range of the DRX parameter configuration, and improving the practicability of the DRX parameter configuration.

Corresponding to the foregoing embodiment of the discontinuous reception configuration method, the present disclosure also provides an embodiment of the discontinuous reception configuration apparatus. In addition, for parts that are not described in detail in the embodiment of the discontinuous reception configuration apparatus, reference may be made to the embodiment of the corresponding discontinuous reception configuration method.

Figure 11:
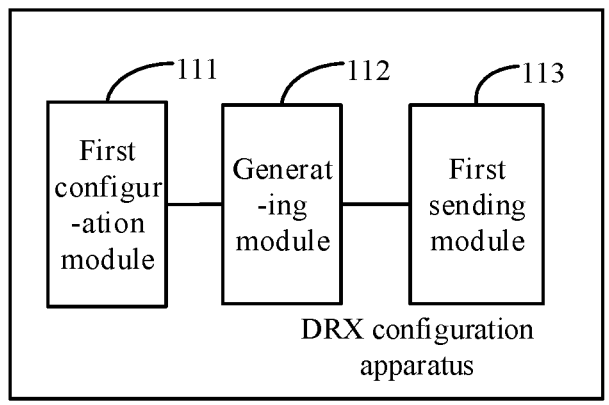
FIG. 11 is a block diagram illustrating a discontinuous reception configuration apparatus according to an example.

FIG. 11 is a block diagram illustrating a discontinuous reception configuration apparatus according to an example. The apparatus is applicable to a bast station. The base station configures at least one band width part (BWP) for a terminal for implementing the DRX configuration method shown in FIG. 1. As shown in FIG. 11, the DRX apparatus may include:
- a first configuration module 111, configured to configure a corresponding designated DRX parameter for a designated BWP;
- a generating module 112, configured to generate a DRX configuration information for indicating that the designated DRX parameter is to be used on the designated BWP;
- a first sending module 113, configured to send the DRX configuration information to the terminal for the terminal to use the designated DRX parameter on the designated BWP based on the DRX configuration information.

It can be seen from the above embodiment that DRX configuration information is generated by configuring the corresponding designated DRX parameters for the designated BWP, where the DRX configuration information is used to indicate the use of the designated DRX parameter on the designated BWP, and send the DRX configuration information to the terminal so that the terminal uses the designated DRX parameter on the designated BWP according to the DRX configuration information, thereby realizing the dynamic configuration of the designated DRX parameter used on each designated BWP, improving the flexibility of DRX parameter configuration, and reducing the power consumption for channel monitoring.

In an embodiment, based on the apparatus shown in FIG. 11, as shown in FIG. 12, the designated BWP is any BWP configured by the base station for the terminal; the first sending module 113 may include:
- an establishing sub-module 121, configured to establishing a binding relationship between BWP and DRX parameter configured by the base station for the terminal;
- a first adding sub-module 122, configured to add the binding relationship to the DRX configuration information,
- a first sending sub-module 123, configured to send the DRX configuration information carrying the binding relationship to the terminal.

It can be seen from the above embodiment that the binding relationship between BWP and DRX parameter configured by the base station for the terminal can be established, and the binding relationship between the BWP and the DRX parameters can be added to the DRX configuration information, and the DRX configuration information carrying the binding relationship between BWP and DRX parameter is sent to the terminal, so that when the terminal switches from the currently activated BWP to the target BWP, the target DRX parameter corresponding to the target BWP can be determined according to the binding relationship and use the target DRX parameter on the target BWP, thereby improving the accuracy of DRX parameter configuration.

In an embodiment, based on the establishment of the device shown in FIG. 12, the binding relationship comprises a one-to-one correspondence between BWP and DRX parameter, and/or a many-to-one correspondence between BWP and DRX parameter.

Figure 13:
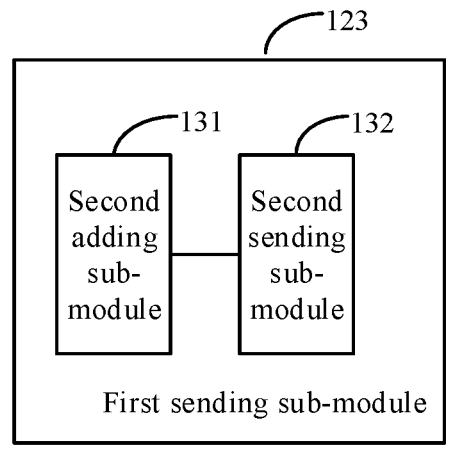
FIG. 13 is another block diagram illustrating a discontinuous reception configuration apparatus according to an example.

In an embodiment, based on the apparatus shown in FIG. 12, as shown in FIG. 13, the first sending sub-module 123 may include:
- a second adding sub-module 131, configured to add the DRX configuration information to a first system message or first dedicated signaling;
- a second sending sub-module 132, configured to send the first system message or the first dedicated signaling to the terminal for the terminal to obtain the DRX configuration information from the first system message or the first dedicated signaling.

It can be seen from the foregoing embodiments that the DRX configuration information can be informed to the terminal through the first system message or the first dedicated signaling, thereby improving the reliability of DRX configuration information transmission.

Figure 14:
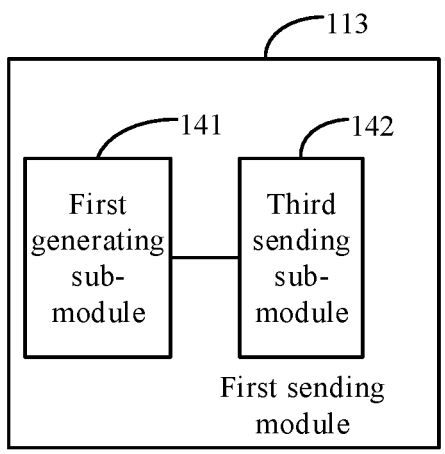
FIG. 14 is another block diagram illustrating a discontinuous reception configuration apparatus according to an example.

In an embodiment, based on the apparatus shown in FIG. 11, as shown in FIG. 14, the designated BWP is a target BWP to which the base station instructs the terminal to switch a BWP; the first sending module may include:
- a first generating sub-module 141, configured to generate a BWP switching command for carrying the DRX configuration information, wherein the DRX configuration information comprises a target DRX parameter corresponding to the target BWP or indication information for characterizing the target DRX parameter corresponding to the target BWP;
- a third sending sub-module 142, configured to send the BWP switching command to the terminal.

It can be seen from the above embodiment that a BWP switching command for carrying DRX configuration information can be generated. The DRX configuration information includes the target DRX parameter corresponding to the target BWP or indication information for characterizing the target DRX parameter corresponding to the target BWP, and The BWP switching command is sent to the terminal, so that when the terminal switches from the currently activated BWP to the target BWP, the corresponding DRX parameters can be used on the target BWP, thereby realizing the DRX parameter adjustment for BWP switching and improving the practicality DRX parameter configuration.

Figure 15:
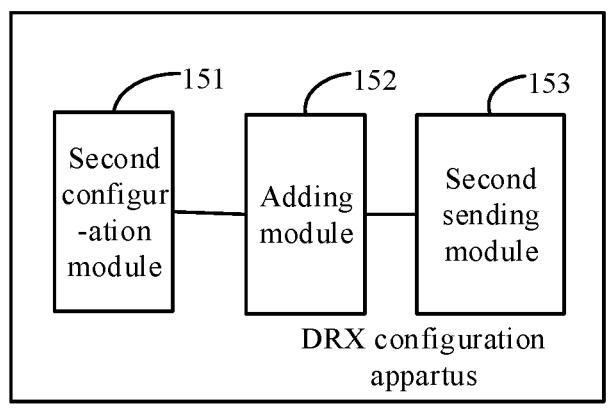
FIG. 15 is another block diagram illustrating a discontinuous reception configuration apparatus according to an example.

In an embodiment, based on the apparatus shown in FIG. 14, as shown in FIG. 15, the apparatus further includes:
- a second configuring module 151, configured to configure a candidate parameter set for the terminal;
- an adding module 152, configured to add the DRX candidate parameter set to a second system message or second dedicated signaling;
- a second sending module 153, configured to send the second system message or the second dedicated signaling to the terminal for the terminal to obtain the DRX candidate parameter set from the second system message or the second dedicated signaling, and determine the target DRX parameter corresponding to the target BWP based on the DRX candidate parameter set and the indication information in the DRX configuration information.

It can be seen from the above embodiment that the DRX candidate parameter set can be configured for the terminal, and the DRX candidate parameter set can be informed to the terminal through the second system message or the second dedicated signaling, which is convenient for the terminal to accurately obtain the DRX parameter from the DRX candidate parameter set when determining the DRX parameter corresponding to the indication information in the DRX configuration information, thereby improving the reliability of determining DRX parameters.

Figure 16:
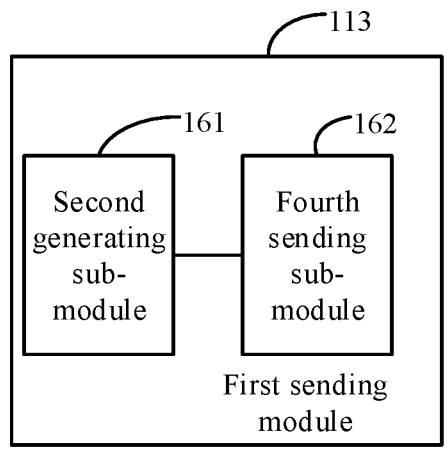
FIG. 16 is another block diagram illustrating a discontinuous reception configuration apparatus according to an example.

In one embodiment, based on the apparatus shown in FIG. 11, as shown in FIG. 16, the designated BWP is a default BWP and/or an initial BWP for implementing an automatic BWP fall back function; the first sending module includes:
- a second generating sub-module 161, configured to generate a third system message or a third dedicated signaling for carrying the DRX configuration information, wherein the DRX configuration information comprises a first default DRX parameter corresponding to the default BWP, and/or a second default DRX parameter corresponding to the initial BWP;
- a fourth sending sub-module 162, configured to send the third system message or the third dedicated signaling to the terminal.

It can be seen from the above embodiment that the third system message or third dedicated signaling for carrying the DRX configuration information can be generated. The DRX configuration information includes the first default DRX parameter corresponding to the default BWP, and/or the first default DRX parameter corresponding to the initial BWP and the third system message or third dedicated signaling is sent to the terminal, so that when the terminal switches from the currently activated BWP to the default BWP or the initial BWP, the corresponding DRX parameter can be used on the default BWP or the initial BWP, thereby realizing DRX parameter adjustment for realizing the automatic BWP fall back function, also expanding the application range of the DRX parameter configuration, and improving the practicability of DRX parameter configuration.

Figure 17:
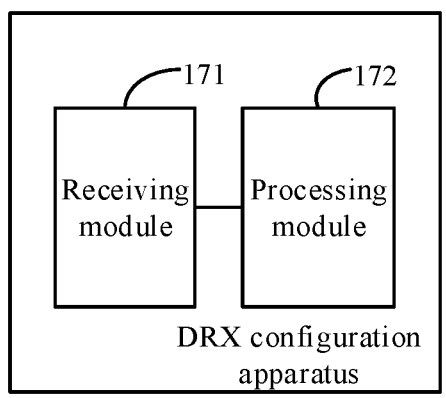
FIG. 17 is a block diagram illustrating a discontinuous reception configuration apparatus according to an example.

FIG. 17 is a block diagram illustrating a discontinuous reception configuration apparatus according to an example. The apparatus is applicable to a terminal. The base station configures at least one band width part (BWP) for the terminal for implementing the DRX configuration method shown in FIG. 8. As shown in FIG. 17, the DRX apparatus may include:
- a receiving module 171, configured to receive a DRX configuration information sent by the base station, the DRX configuration information is to indicate that a designated DRX parameter is to be used on a designated BWP;
- a processing module 172, configured to use the designated DRX parameter on the designated BWP based on the DRX configuration information.

It can be seen from the above embodiments that by receiving the DRX configuration information sent by the base station, the DRX configuration information is used to indicate the use of the designated DRX parameter on the designated BWP. The designated DRX parameter is the corresponding DRX parameter configured by the base station for the designated BWP, and the designated DRX parameter is used on the designated BWP according to the DRX configuration information, thereby realizing the dynamic configuration of the designated DRX parameter used on each designated BWP, improving the flexibility of DRX parameter configuration, and reducing power consumption for channel monitoring.

Figure 18:
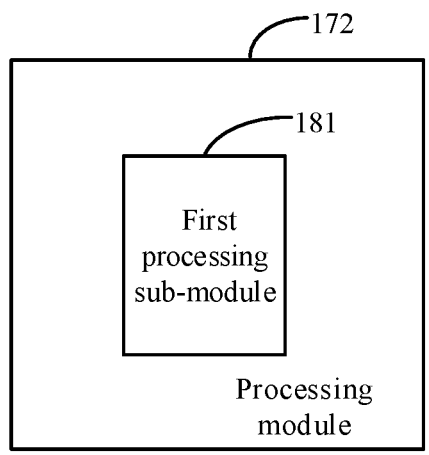
FIG. 18 is another block diagram illustrating a discontinuous reception configuration apparatus according to an example.

In an embodiment, based on the apparatus shown in FIG. 17, as shown in FIG. 18, the designated BWP is any one of BWPs configured by the base station for the terminal; the DRX configuration information comprises a binding relationship between BWP and DRX parameter configured by the base station for the terminal;

the processing module 172 may include:
a first processing sub-module 181, configured to, when switching from the currently activated BWP to a target BWP, determine a target DRX parameter corresponding to the target BWP based on the binding relationship, and use the target DRX parameter on the target BWP.

In an embodiment, based on the establishment of the device shown in FIG. 18, the binding relationship comprises a one-to-one correspondence between BWP and DRX parameter, and/or a many-to-one correspondence between BWP and DRX parameter.

Figure 19:
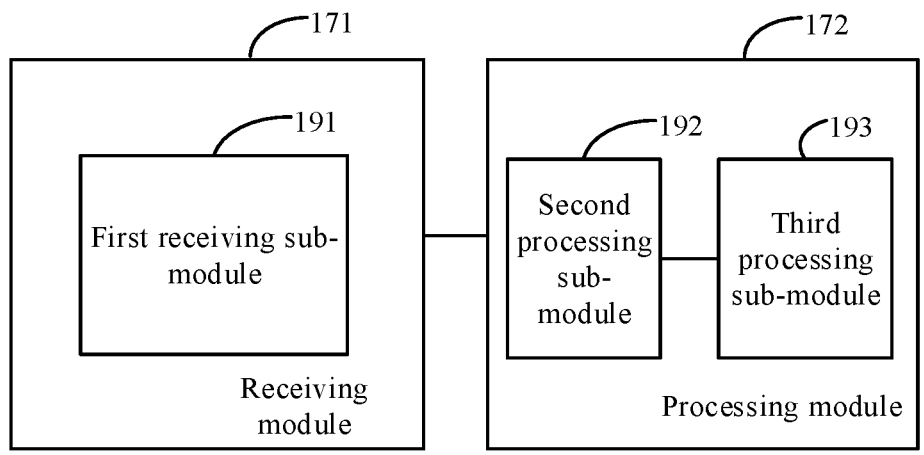
FIG. 19 is another block diagram illustrating a discontinuous reception configuration apparatus according to an example.

In an embodiment, based on the apparatus shown in FIG. 17, as shown in FIG. 19, the designated BWP is a target BWP to which the base station instructs the terminal to switch a BWP;

the receiving module 171 may include:
a first receiving sub-module, configured to, receive, from the base station, a BWP switching command for carrying the DRX configuration information, wherein the DRX configuration information comprises a target DRX parameter corresponding to the target BWP or indication information for characterizing the target DRX parameter corresponding to the target BWP;

the processing module 172 may include:
a second processing sub-module 192, configured to in response to that the DRX configuration information comprises a target DRX parameter corresponding to the target BWP, use the target DRX parameter on the target BWP;
a third processing sub-module 193, configured to in response to that the DRX configuration information comprises indication information for characterizing the target DRX parameter corresponding to the target BWP, determine the target DRX parameter corresponding to the indication information based on a DRX candidate parameter set and the DRX configuration information configured by the base station for the terminal, and use the target DRX parameter on the target BWP.

It can be seen from the above embodiment that a BWP switching command for carrying the DRX configuration information sent by the base station is received, where the DRX configuration information includes the target DRX parameter corresponding to the target BWP or indication information for to characterizing the target DRX parameters corresponding to the target BWP; if the DRX configuration information includes the target DRX parameter corresponding to the target BWP, use the corresponding target DRX parameter on the target BWP; if the DRX configuration information includes indication information for characterizing the target DRX parameter corresponding to the target BWP, the target DRX parameter corresponding to the indication information is determined according to the DRX candidate parameter set and DRX configuration information configured by the base station for the terminal, and the corresponding target DRX parameter is used on the target BWP, thereby realizing the adjustment of DRX parameters for BWP switching and improving the practicability of DRX parameter configuration.

Figure 20:
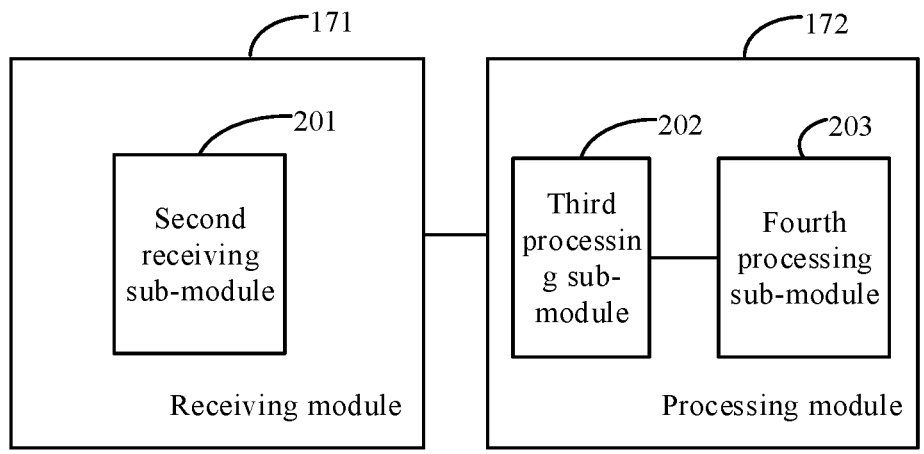
FIG. 20 is another block diagram illustrating a discontinuous reception configuration apparatus according to an example.

In one embodiment, based on the apparatus shown in FIG. 17, as shown in FIG. 20, the designated BWP is a default BWP and/or an initial BWP for implementing an automatic BWP fall back function;

the receiving module 171 may include:
a second receiving sub-module, configured to receive a system message or a dedicated signaling for carrying the DRX configuration information, wherein the DRX configuration information comprises a first default DRX parameter corresponding to the default BWP, and/or a second default DRX parameter corresponding to the initial BWP; and the processing module 172 may include:
a third processing sub-module 202, configured to, when falling back from the currently activated BWP to the default BWP, use the first default DRX parameter corresponding to the default BWP on the default BWP;
a fourth processing sub-module 203, configured to, when falling back from the currently activated BWP to the initial BWP, use the second default DRX parameter corresponding to the initial BWP on the initial BWP.

It can be seen from the above embodiment that the system message or the dedicated signaling for carrying the DRX configuration information sent by the base station is received. The DRX configuration information includes a first default DRX parameter corresponding to the default BWP and/or a second default DRX corresponding to the initial BWP parameter; when falling back from the currently activated BWP to the default BWP, the first default DRX parameter corresponding to the default BWP is used on the default BWP; when falling back from the currently activated BWP to the initial BWP, the second default DRX parameter corresponding to the initial BWP is used on the initial BWP; thereby realizing DRX parameter adjustment for realizing the automatic BWP fall back function, expanding the application range of the DRX parameter configuration, and improving the practicability of the DRX parameter configuration.

For the device examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. One of ordinary skill in the art can understand and implement the present disclosure without creative work.

Correspondingly, the present disclosure also provides a non-transitory computer-readable storage medium storing a computer program, and the computer program is used to execute the discontinuous reception configuration method described in any one of FIGS. 1 to 7.

Correspondingly, the present disclosure also provides a non-transitory computer-readable storage medium storing a computer program, and the computer program is used to execute the discontinuous reception configuration method described in any one of FIGS. 8 to 10.

Correspondingly, the present disclosure also provides a discontinuous reception configuration apparatus. The apparatus is applicable to a base station, and the base station configures at least one bandwidth part BWP for a terminal, and the apparatus includes:

a processor; and
a memory storing processor-executable instructions;
wherein the processor is configured to:
configure a corresponding designated DRX parameter for a designated BWP;
generate a DRX configuration information for indicating that the designated DRX parameter is to be used on the designated BWP;
send the DRX configuration information to the terminal for the terminal to use the designated DRX parameter on the designated BWP based on the DRX configuration information.

Figure 21:
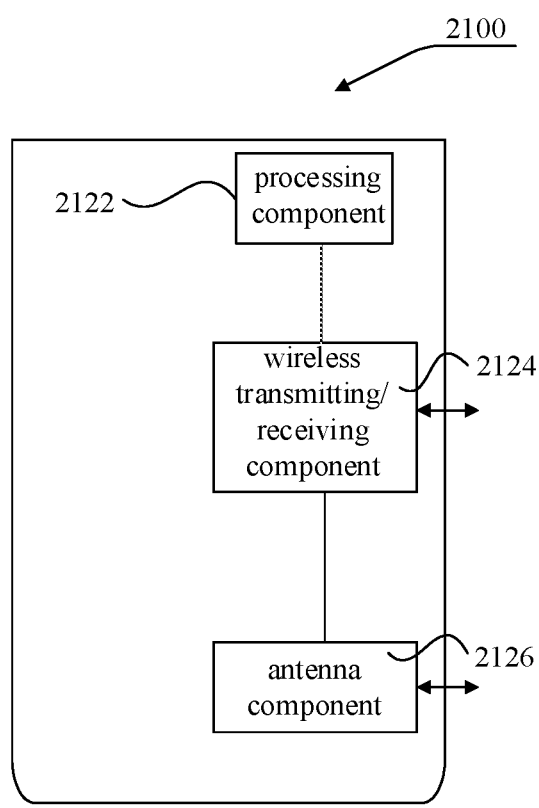
FIG. 21 is a schematic structural diagram illustrating a discontinuous reception configuration apparatus according to an example.

As shown in FIG. 21, FIG. 21 is a schematic structural diagram illustrating a discontinuous reception configuration apparatus according to an example. The apparatus 2100 can be a base station. Referring to FIG. 21, the device 2100 includes a processing component 2122, a wireless transmitting/receiving component 2124, an antenna component 2126, and a signal processing portion specific to a wireless interface. The processing component 2122 may further include one or more processors.

One of the processors in the processing component 2122 may be configured to execute any of the discontinuous reception configuration methods described above.

Correspondingly, the present disclosure also provides a discontinuous reception configuration apparatus. The apparatus is applicable to a terminal, and a base station configures at least one bandwidth part BWP for the terminal, and the apparatus includes:

a processor; and
a memory storing processor-executable instructions;
wherein the processor is configured to:
receive a DRX configuration information sent by the base station, the DRX configuration information is to indicate that a designated DRX parameter is to be used on a designated BWP;
use the designated DRX parameter on the designated BWP based on the DRX configuration information.

Figure 22:
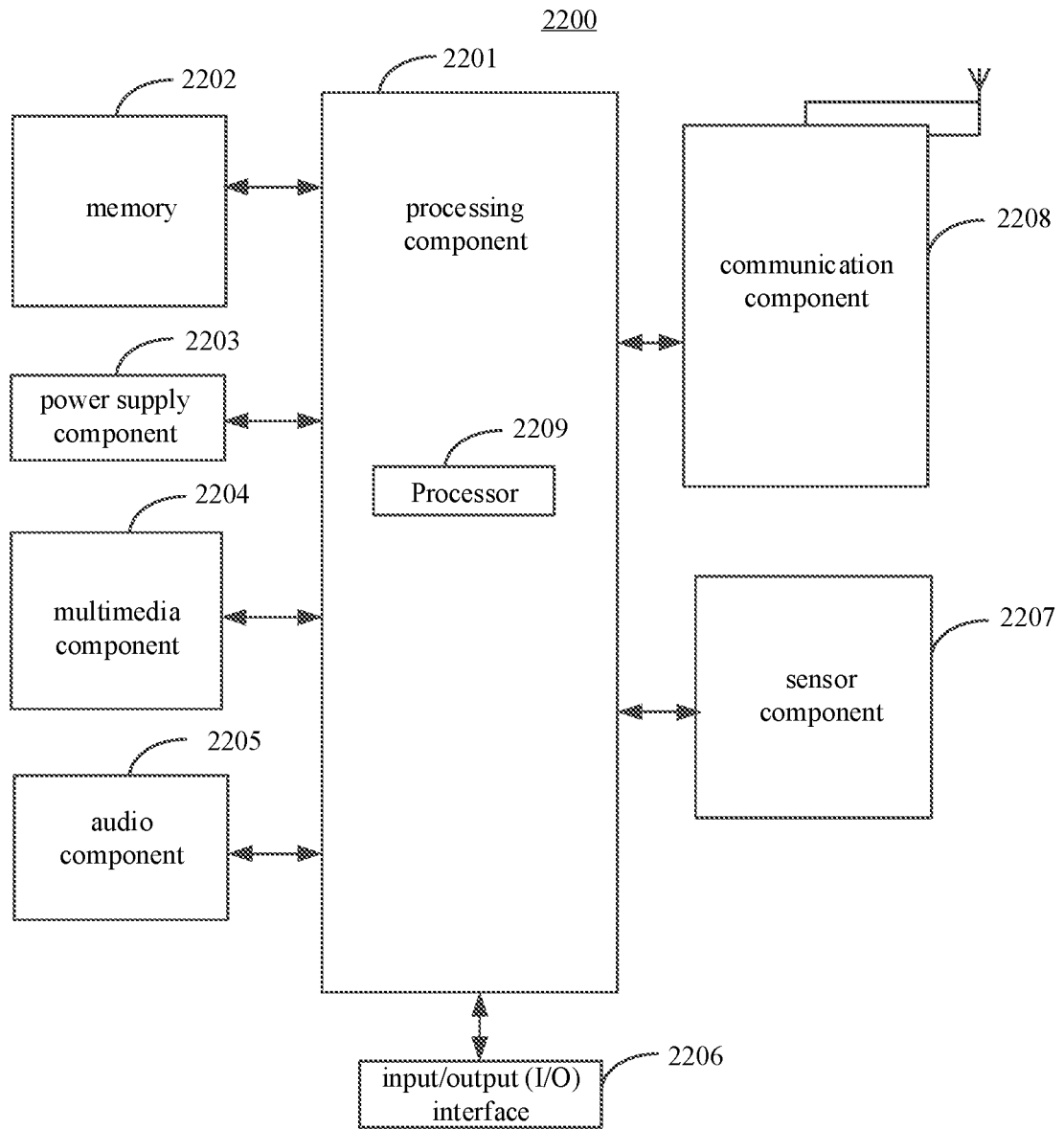
FIG. 22 is a schematic structural diagram illustrating a discontinuous reception configuration apparatus according to an example.

FIG. 22 is a schematic structural diagram illustrating a discontinuous reception configuration apparatus according to an example. As shown in FIG. 22, a discontinuous reception configuration apparatus 2200 is shown according to an exemplary embodiment. The apparatus 2200 may be a computer, a mobile phone, a digital broadcasting terminal, a messaging device, a game console, a tablet device, or a medical device, fitness equipment, personal digital assistants and other terminals.

As shown in FIG. 22, the apparatus 2200 can include one or more of the following components: a processing component 2201, a memory 2202, a power supply component 2203, a multimedia component 2204, an audio component 2205, an input/output (I/O) interface 2206, a sensor component 2207, and a communication component 2208.

The processing component 2201 generally controls overall operations of the apparatus 2200, such as operations associated with display, phone calls, data communications, camera operations, and recording operations. The processing component 2201 can include one or more processors 2209 to execute instructions to complete all or part of the steps of the above methods. Moreover, the processing component 2201 may include one or more modules to facilitate interaction between the processing component 2201 and other components. For example, the processing component 2201 can include a multimedia module to facilitate the interaction between the multimedia component 2204 and the processing component 2201.

The memory 2202 is configured to store various types of data to support the operation of the apparatus 2200. Examples of such data include instructions for any application or method operated on the apparatus 2200, contact data, phonebook data, messages, pictures, videos, and so on. The memory 2202 can be implemented by any type of volatile or non-volatile storage devices or their combination, such as a static random access memory (SRAM), an electrically erasable programmable read-only memory (EEPROM), erasable Programmable read only memory (EPROM), a programmable read only memory (PROM), a read only memory (ROM), a magnetic memory, a flash memory, a magnetic or optical disk.

The power supply component 2203 supplies power for different components of the apparatus 2200. The power component 2203 may include a power management system, one or more power sources, and other components associated with power generated, managed, and distributed for the apparatus 2200.

The multimedia component 2204 includes a screen providing an output interface between the apparatus 2200 and a user. In some embodiments, the screen may include a liquid crystal display (LCD) and a touch panel (TP). When the screen includes a touch panel, the screen may be implemented as a touch screen to receive input signals from the user. The TP can include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 2204 includes a front camera and/or a rear camera. The front camera and/or rear camera may receive external multimedia data when the apparatus 2200 is in an operating mode, such as a photographing mode or a video mode. Each of the front camera and the rear camera can be a fixed optical lens system or have focal length and optical zooming capability.

The audio component 2205 is configured to output and/or input an audio signal. For example, the audio component 2205 includes a microphone (MIC). When the apparatus 2200 is in an operating mode, such as a call mode, a record mode and a voice recognition mode, the microphone is configured to receive an external audio signal. The received audio signal may be further stored in the memory 2202 or transmitted via the communication component 2608. In some examples, the audio component 1616 further includes a speaker for outputting an audio signal.

The I/O interface 2206 provides an interface between the processing component 2201 and a peripheral interface module which may be a keyboard, a click wheel, a button, or the like. These buttons may include but are not limited to: home button, volume button, start button, and lock button.

The sensor component 2207 includes one or more sensors to provide status assessments of various aspects for the apparatus 2200. For example, the sensor component 2207 may detect an open/closed state of the apparatus 2200 and a relative positioning of components such as the display and keypad of the apparatus 2200, and the sensor component 2207 can also detect a change in position of the apparatus 2200 or a component of the apparatus 2200, the presence or absence of user contact with the apparatus 2200, orientation or acceleration/deceleration of the apparatus 2200, and temperature change of the apparatus 2200. The sensor assembly 2207 may include a proximity sensor configured to detect presence of nearby objects without physical contact. The sensor component 2207 may further include an optical sensor, such as a CMOS or CCD image sensor, for imaging applications. In some examples, the sensor component 2207 can further include an acceleration sensor, a gyroscope sensor, a magnetic sensor, a pressure sensor, or a temperature sensor.

The communication component 2208 is configured to facilitate wired or wireless communication between the apparatus 2200 and other devices. The apparatus 2200 can access a wireless network based on a communication standard, such as Wi-Fi, 2G or 3G, or a combination thereof. In an exemplary embodiment, the communication component 2208 receives a broadcast signal or broadcast related information from an external broadcast management system via a broadcast channel. In some embodiments, the communication component 2208 also includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an exemplary embodiment, the apparatus 2200 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an exemplary embodiment, there is further provided a non-transitory computer-readable storage medium having instructions, such as the memory 2202 having instructions, which can be executed by the processor 2209 of the apparatus 2200 to complete the foregoing methods. For example, the non-transitory computer-readable storage medium can be a ROM, a random access memory (RAM), a CD-ROM, a magnetic tape, a floppy disk, an optical data storage device, or the like.

When the instructions in the storage medium are executed by the processor, the apparatus 2200 may execute any of the discontinuous reception configuration methods described above.

After considering the specification and practicing the disclosure disclosed herein, one of ordinary skill in the art will easily conceive of other embodiments of the present disclosure. This disclosure is intended to cover any variations, applications, or adaptive changes of the present disclosure. These variations, applications, or adaptive changes follow the general principles of the present disclosure and include common knowledge or conventional technical means in the art not recorded in the present disclosure. The description and the embodiments are only illustrative, and the true scope and spirit of the present disclosure are set forth in the appended claims.

It should be understood that the present disclosure is not limited to the exact structure that has been described above and illustrated in the drawings, and various modifications and changes can be made without departing from the scope of the present disclosure. The scope of the present disclosure is only limited by the appended claims.

The invention claimed is:

1. A method for discontinuous reception (DRX) configuration applied to a base station and comprising:
configuring a corresponding designated DRX parameter for a designated bandwidth part (BWP), wherein the base station configures at least one BWP for a terminal;
generating DRX configuration information for indicating that the designated DRX parameter is to be used on the designated BWP; and
sending the DRX configuration information to the terminal for the terminal to use the designated DRX parameter on the designated BWP based on the DRX configuration information,
wherein the designated DRX parameter comprises at least one of:
a DRX wake-up duration configured for at least one of monitoring physical downlink control channel or monitoring physical downlink shared channel;
a DRX inactivity timer configured to delay the DRX wake-up duration;
a short DRX cycle;
a long DRX cycle; or
a DRX short cycle timer configured to enter the long DRX cycle after the DRX short cycle timer expires,
wherein sending the DRX configuration information to the terminal for the terminal to use the designated DRX parameter on the designated BWP based on the DRX configuration information comprises:
generating a BWP switching command for carrying the DRX configuration information, wherein the DRX configuration information comprises indication information for characterizing a target DRX parameter corresponding to a target BWP, wherein the designated BWP is the target BWP to which the base station instructs the terminal to switch a BWP;
sending the BWP switching command to the terminal;
configuring a candidate parameter set for the terminal;
adding the DRX candidate parameter set to a first system message or first dedicated signaling; and
sending the first system message or the first dedicated signaling to the terminal for the terminal to obtain the DRX candidate parameter set from the first system message or the first dedicated signaling, and determine the target DRX parameter corresponding to the target BWP based on the DRX candidate parameter set and the indication information in the DRX configuration information.

2. The method of claim 1, wherein sending the DRX configuration information to the terminal further comprises:
establishing a binding relationship between BWP and DRX parameter configured by the base station for the terminal, wherein the designated BWP is any one of BWPs configured by the base station for the terminal;
adding the DRX configuration information to a second system message or second dedicated signaling; and
sending the second system message or the second dedicated signaling to the terminal for the terminal to obtain the DRX configuration information from the second system message or the second dedicated signaling.

3. The method of claim 2, wherein the binding relationship comprises at least one of:
a one-to-one correspondence between BWP and DRX parameter, or
a many-to-one correspondence between BWP and DRX parameter.

4. The method of claim 1, wherein sending the DRX configuration information to the terminal further comprises:
generating a third system message or third dedicated signaling for carrying the DRX configuration information, wherein the DRX configuration information comprises at least one of a first default DRX parameter corresponding to a default BWP, or a second default DRX parameter corresponding to an initial BWP, and wherein the designated BWP comprises at least one of the default BWP for implementing an automatic BWP fall back function or the initial BWP for implementing the automatic BWP fall back function; and sending the third system message or the third dedicated signaling to the terminal.

5. A non-transitory computer-readable storage medium storing a plurality of computer programs, wherein the computer programs are configured to perform the method for DRX configuration according to claim 1.

6. A base station, comprising:
or more processors; and
a non-transitory computer-readable storage medium storing instructions executable by the one or more processors, wherein the one or more processors are configured to perform the method for DRX configuration according to claim 1.

7. A method for discontinuous reception (DRX) configuration applied to a terminal and comprising:
receiving DRX configuration information sent by a base station, wherein the DRX configuration information indicates that a designated DRX parameter is to be used on a designated bandwidth part (BWP), wherein the base station configures at least one BWP for the terminal; and
using the designated DRX parameter on the designated BWP based on the DRX configuration information,
wherein the designated DRX parameter comprises at least one of:
a DRX wake-up duration configured for at least one of monitoring physical downlink control channel or monitoring physical downlink shared channel;
a DRX inactivity timer configured to delay the DRX wake-up duration;
a short DRX cycle;
a long DRX cycle; or
a DRX short cycle timer configured to enter the long DRX cycle after the DRX short cycle timer expires,
wherein receiving the DRX configuration information sent by the base station comprises:
receiving, from the base station, a BWP switching command for carrying the DRX configuration information, wherein the DRX configuration information comprises indication information for characterizing a target DRX parameter corresponding to a target BWP, wherein the designated BWP is the target BWP to which the base station instructs the terminal to switch a BWP; and
wherein using the designated DRX parameter on the designated BWP based on the DRX configuration information comprises:
determining, in response to that the DRX configuration information comprises the indication information for characterizing the target DRX parameter corresponding to the target BWP, the target DRX parameter corresponding to the indication information based on a DRX candidate parameter set received from the base station and the DRX configuration information configured by the base station for the terminal, and using the target DRX parameter on the target BWP.

8. The method of claim 7, wherein using the designated DRX parameter on the designated BWP based on the DRX configuration information further comprises:
determining, when switching from a currently activated BWP to the target BWP, the target DRX parameter corresponding to the target BWP based on a binding relationship, wherein the designated BWP is any one of BWPs configured by the base station for the terminal, and wherein the DRX configuration information further comprises the binding relationship between BWP and DRX parameter configured by the base station for the terminal carried over a second system message or a second dedicated signaling; and
using the target DRX parameter on the target BWP.

9. The method of claim 8, wherein the binding relationship comprises at least one of:
a one-to-one correspondence between BWP and DRX parameter, or
a many-to-one correspondence between BWP and DRX parameter.

10. The method of claim 7, wherein receiving the DRX configuration information sent by the base station further comprises:
receiving a system message or dedicated signaling for carrying the DRX configuration information, wherein the DRX configuration information comprises at least one of a first default DRX parameter corresponding to a default BWP, or a second default DRX parameter corresponding to the initial BWP, wherein the designated BWP comprises at least one of the default BWP for implementing an automatic BWP fall back function or an initial BWP for implementing the automatic BWP fall back function; and
wherein using the designated DRX parameter on the designated BWP based on the DRX configuration information comprises:
using, when falling back from a currently activated BWP to the default BWP, the first default DRX parameter corresponding to the default BWP on the default BWP; and
using, when falling back from the currently activated BWP to the initial BWP, the second default DRX parameter corresponding to the initial BWP on the initial BWP.

11. A non-transitory computer-readable storage medium storing a plurality of computer programs, wherein the computer programs are configured to perform the method for DRX configuration according to claim 7.

12. A terminal, comprising:
one or more processors; and
a non-transitory computer-readable storage medium storing instructions executable by the one or more processors, wherein the one or more processors are configured to:
receive discontinuous reception (DRX) configuration information sent by a base station, wherein the DRX configuration information indicates that a designated DRX parameter is to be used on a designated bandwidth part (BWP), wherein the base station configures at least one BWP for a terminal; and
use the designated DRX parameter on the designated BWP based on the DRX configuration information,
wherein the designated DRX parameter comprises at least one of:
a DRX wake-up duration configured for at least one of monitoring physical downlink control channel or monitoring physical downlink shared channel;
a DRX inactivity timer configured to delay the DRX wake-up duration;
a short DRX cycle;
a long DRX cycle; or
a DRX short cycle timer configured to enter the long DRX cycle after the DRX short cycle timer expires,
wherein receiving the DRX configuration information sent by the base station comprises:

receiving, from the base station, a BWP switching command for carrying the DRX configuration information, wherein the DRX configuration information comprises indication information for characterizing a target DRX parameter corresponding to a target BWP, wherein the designated BWP is the target BWP to which the base station instructs the terminal to switch a BWP; and wherein using the designated DRX parameter on the designated BWP based on the DRX configuration information comprises:

determining, in response to that the DRX configuration information comprises the indication information for characterizing the target DRX parameter corresponding to the target BWP, the target DRX parameter corresponding to the indication information based on a DRX candidate parameter set received from the base station and the DRX configuration information configured by the base station for the terminal, and using the target DRX parameter on the target BWP.

* * * * *